Nov. 17, 1970    KEIGO IIZUKA    3,541,571

METHOD FOR VISIBLY RECORDING ELECTROMAGNETIC WAVES

Filed Jan. 22, 1968    2 Sheets-Sheet 1

INVENTOR.
KEIGO IIZUKA
BY
*Blair Buckles Cesari + St Ong*
ATTORNEYS

United States Patent Office 3,541,571
Patented Nov. 17, 1970

3,541,571
METHOD FOR VISIBLY RECORDING ELECTROMAGNETIC WAVES
Keigo Iizuka, 109 Warren St., Apt. 7,
Watertown, Mass. 02172
Filed Jan. 22, 1968, Ser. No. 699,407
Int. Cl. G11c 11/16; G01d 15/10
U.S. Cl. 346—1
16 Claims

ABSTRACT OF THE DISCLOSURE

Physical phenomena characterized by, or capable of generating, thermal fields corresponding to the phenomena are recorded by utilizing the thermal fields to control the diffusion rates and reaction rates of one or more recording agents through a diffusion medium to a receiving layer. Either the recording agents, or the diffusion layer, or both, are temperature-sensitive.

The method is particularly applicable to recording the intensity and phase of high frequency electromagnetic waves directly on photographic film. The film is first sensitized by uniformly exposing it to actinic light for a brief time interval and is then coated with a developing agent and immediately inserted in the field while being protected from further exposure to light. The field selectively heats the film in accordance with the local field intensity to thereby selectively develop the film and form a replica of the field intensity variations.

In addition to measuring the fields of devices such as antennas, transmission lines, and waveguides, the method is directly applicable to the construction of microwave holograms by providing a reference field at the film surface to cause the film to record the phase as well as the intensity of a field obtained by reflection from a specimen.

BACKGROUND OF THE INVENTION

Field the invention

The invention relates to a method of recording a thermal field.

More particularly, the invention is directed to a method for recording physical phenomena associated with, or capable of generating, thermal fields by directly recording the thermal fields.

The invention is especially useful for recording the intensity of an electromagnetic field directly on a temperature responsive recording medium which provides a visible record of the field intensity distribution. The invention also relates to a method for the rapid construction of microwave holograms.

Prior art

Present methods of measuring the intensity and phase of an electromagnetic field utilize a probe such as metallic dipole probe which is inserted directly into the field; the resultant current or voltage induced in the probe provides an indication of the intensity of the field at a particular point or set of points. The accuracy of such methods is limited by the type and configuration of the probe and its lead wires which disturb the local field and consequently introduce errors into the measurement.

When it is desired to measure the field over a large area, no simple technique is currently available other than point-by-point mapping of the field by a probe of the type described. In addition to being subject to the errors mentioned above, this technique is also unduly time-consuming. The disadvantages of this technique become especially apparent when it is desired to construct a microwave hologram of a specimen by recording over a given area the intensity and relative phase of microwaves reflected from the specimen.

BRIEF SUMMARY OF THE INVENTION

Accordingly, it is an object of the invention to provide a method of recording a thermal field.

Further, it is an object of the invention to provide a method of recording a physical phenomenon capable of generating a thermal field corresponding to the phenomena.

Another object of the invention is to provide a method of recording the intensity of electromagnetic waves.

Still another object of the invention is to provide a method of recording the intensity of electromagnetic waves without disturbing the local field at the site of the measurement.

Yet another object of the invention is to provide a method of quickly and easily mapping an electromagnetic field over a given area.

A still further object of the invention is to provide a rapid and accurate method of constructing microwave holograms.

Other and further objects and features of the invention will be more readily ascertained from the detailed description hereinafter.

Heretofore it has been assumd by those skilled in the art that no analog of phohographic film exists for high frequency electromagnetic waves such as microwaves. Contrary to this assumption, I have found that photographic film of the type containing a photosensitive agent such as silver halide provides an especially useful medium for recording high frequency electromagnetc waves in the microwave region provided that the film is first "sensitized" by briefly exposing the film to actinic light and then coating the film with a developing agent before inserting it into the field.

The film is then inserted into the electromagnetic field, and maintained there for a given time interval. The portions of the electric field vectors which are aligned with the plane of the film generate localized currents within the film which cause localized joule heating to form a "thermal image" within the film that is a replica of the electromagnetic field intensity distribution. The different temperatures in this image vary the diffusion rates and reaction rate of the developing agent at different points on the film to cause selective development of the film in accordance with the thermal image and this reproduces the electromagnetic field pattern on the film. After a suitable time interval, of the order of from five to fifty seconds for the more common type films, the film is removed from the field and is washed and "fixed" to prevent further development. The resultant pattern on the film provides a direct indication of the intensity of the field at each and every point on the film. If a reference field is superimposed on the local field being measured, the phase of the local field with respect to the reference field may be also be recorded.

The film may be the usual photographic film having photosensitive agents distributed in an emulsion such as gelatin and which is normally developed, after exposure to actinic light by a suitable developing agent, or it may consist of film of the type sold under the trademark "Polaroid" in which a viscous developing agent is normally released onto the emulsion after exposure to actinic light. The latter is especially convenient to handle.

In addition to measuring and recording the intensity of the electromagnetic fields in such devices as antennas, transmission lines and microwave cavities, my invention is also especially useful in such applications as microwave holography in which microwaves reflected from a specimen being studied are intercepted at the surface of a film sensitized in accordance with the invention and are there recorded, together with a reference field which is also directed at the film surface. The two fields form a hologram which records and preserves information concerning the intensity and phase of the microwaves reflected from the specimen; the hologram is used to reconstruct a replica of the original specimen after reduction of the microwave hologram to its optical counterpart.

BRIEF DESCRIPTION OF THE DRAWINGS

For a fuller understanding of the nature and objects of the invention, reference should be had to the following detailed description taken in conjunction with the accompanying drawings, in which.

SPECIFIC DESCRIPTION OF THE INVENTION

Figure 1:
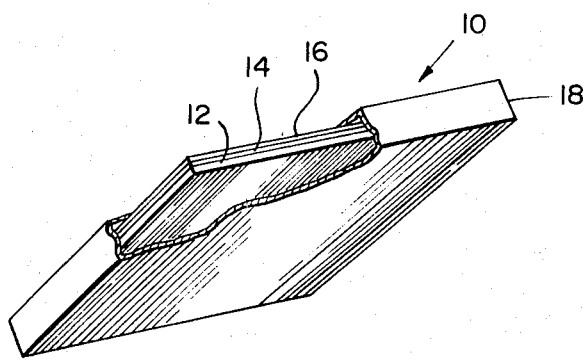
FIG. 1 is a pictorial view, partly in section, of a film packet enclosed in a light-tight casing which is appropriate for use in conjunction with my invention.

FIG. 1 shows a film pack 10 suitable for use in my invention. The pack 10 consists of a base 12 on which is coated a photographic emulsion 14 having the usual photosensitive agents such as silver halides suspended in it. The emulsion 14 is "sensitized" by first briefly exposing it in a uniform manner to actinic light and then placing it in intimate contact with a photographic developing agent of the usual type by any suitable means; for purposes of illustration, the emulsion is shown as being brought into contact with the developing agent by means of a layer 16 of tissue paper or other absorbent material impregnated with the developing agent. The base 12, emulsion 14, and developing layer 16 are then enclosed in a protective container 18 which completely surrounds these materials and shields them from incident light. The container 18 is formed of a material such as cardboard on opaque plastic which is capable of shielding the film from actinic light but which readily allows electromagnetic waves in the microwave region to penetrate it. Such materials are also relatively poor heat conductors and thus will not interfere with the recording process. The container 18 may be omitted if the recording is to be accomplished under dark room conditions.

Figure 2:
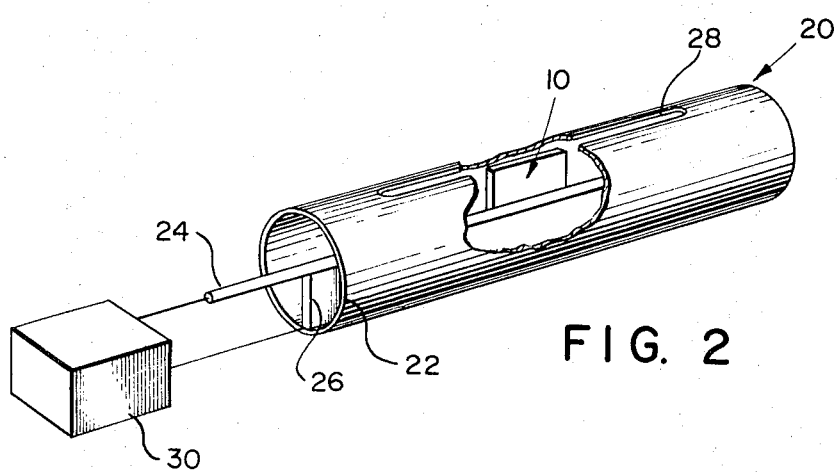
FIG. 2 is a pictorial view, partly in section, of a transmission line having a film packet inserted therein for measurement of the field within the line.

As soon as possible after the developing agent is coated on the emulsion layer 14, the film pack 10 is placed directly into the field and is maintained there for a predetermined length of time dependent on the frequency and intensity of the field and on the characteristics of the photosensitive agent and the developing agent. The recording process for recording electromagnetic waves having a frequency of the order of $10^9$ Hz. is illustrated in FIG. 2 which is a pictorial view of a transmission line 20 having a cylindrical conductive shell 22 surrounding a center conductor 24; the conductor 24 is held within the shell by means of an insulating standoff 26. A slot 28 extends through a portion of the shell 22 so that the film pack 10 containing the sensitized emulsion may be inserted into its interior. Electromagnetic waves are established in the transmission line by means of a generator 30 connected between the shell 22 and the inner conductor 24. These waves are recorded on the emulsion layer within the pack 10.

After a sufficient time interval, typically of the order of from five to fifty seconds, depending on the field strength and the type of film used, the film pack 10 is removed from the field and the film is released from the protective package 18. The layer 16 containing the developer is then stripped away from the emulsion layer 14 and the film is fixed in the usual photographic fixing solution, thereby exposing to the observer a pattern which is indicative of the field in which the film pack was placed.

Figure 3:
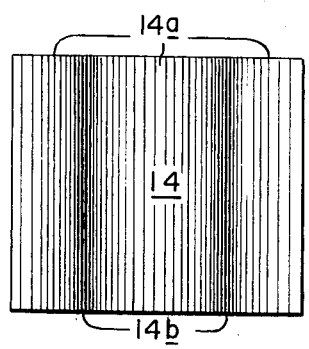
FIG. 3 is a planar view of a "developed" film such as may be obtained from the waveguide of FIG. 2 and showing the variations in density of the film corresponding to the variations in intensity of the electromagnetic field being measured.

FIG. 3 shows a typical standing wave pattern along the coaxial line illustrated in FIG. 2 measured by the present method. The emulsion layer 14 contains areas of lesser density 14a and areas of greater density 14b extending transversely across this layer. The density of these areas along each portion of the emulsion is directly proportional to the intensity of that portion of the electric field component of the electromagnetic field that lies in the plane of the emulsion; the emulsion thus effectively "maps" the local field to which it has been exposed by generating a thermal image of the field. Thus, the field established in the transmission line is directly and accurately recorded on the film.

As stated previously, photographic film is preferably used in practicing the method of my invention since such film is found to possess the desired temperature sensitivity. This film may be ordinary photographic film either of the conventional type such as that formed from a suspension of silver halide grains in an emulsion which is normally developed, after exposure, by an external developing agent; or it may be film of the type which is sold under the trademark "Polaroid" and which uses a viscous developing agent which is released onto the emulsion layer by passing the emulsion layer and the layer containing the developing agent face to face through a pair of pressure rollers. The latter type of film possesses the advantages of being mechanically easy to handle. Whichever film is used, the film must first be sensitized by exposure to a uniform actinic light before the developing agent is spread upon the emulsion layer. Although the exposure time and intensity will vary with different film types, light exposure times of from $\frac{1}{250}$ to $\frac{1}{50}$ of a second to light having a 75 ASA intensity rating will be found appropriate for films of the more common type having speeds ranging upwards from 75 for color film or 400 for black and white film. Generally the slower speed film is most desirable.

The formation of an "image" on the film by an electromagnetic field is dependent on the temperature sensitivity of the developing process. The electric field component in the plane of the film produces a heating effect in the exposed silver halide grains by inducing a current in these grains; this causes a joule heating in the grains which raises their temperature in accordance with the intensity of the field acting upon them. Thus a thermal field which is a replica of the intensity distribution of the electromagnetic field is produced in the film by the field. The localized heating in the grains leads to a localized increase in the diffusion rate of the developing agent to the grain sites and additionally hastens the chemical development in the heated portions of the film. When the film is removed from the field and the image is "fixed" to prevent further development, a visible pattern corresponding to the field intensity distribution appears.

To enhance the sensitivity of the film to the field to be recorded, the film may advantageously be chilled to the temperature of Dry Ice immediately before inserting it into the electromagnetic field. Under such circumstances, an exposure time to microwaves of from five to fifteen seconds will produce a relatively sharp "image" when subjected to an electromagnetic field having an electric field strength of 0.1 watt/in.$^2$ or higher.

Although there are no sharply defined limits on the frequency of the fields which may be recorded with my invention, the recording process is most effective when fields having frequencies of the order of $10^7$ to $10^{10}$ Hz. are to be recorded. At frequencies above or below these frequencies, the heating effect is less intense and thus the sensitivity of the film is accordingly diminished.

Figure 4:
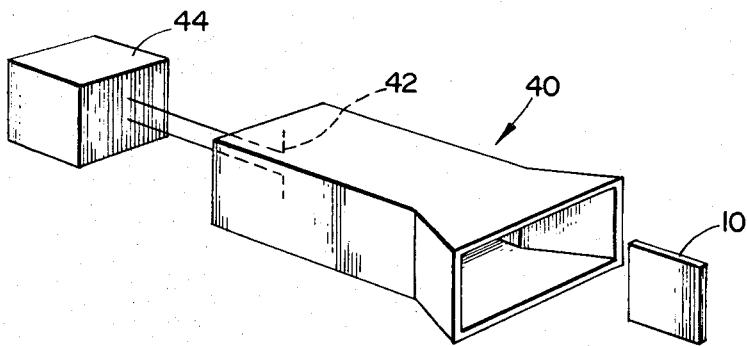
FIG. 4 is a schematic diagram of a microwave antenna having a sensitized film positioned adjacent the antenna for recording the radiated field pattern.

In addition to measuring the electromagnetic field in a transmission line or waveguide, one may also advantageously utilize my invention in other applications. One such application is shown in FIG. 4 which is a pictorial view of a microwave antenna 40 driven by a dipole 42 coupled to a source 44 which supplies high frequency electromagnetic signals in the microwave region to the dipole. A film pack 10 of the type previously described is positioned in front of the antenna and is axially aligned with it to record the field pattern radiated by the antenna. After irradiation by the field, the film is processed as described above to provide a visible record of the field intensity distribution. This provides a simple, rapid, and convenient method of examining the radiation patterns of microwave and high frequency radio wave antennas.

Figure 5:
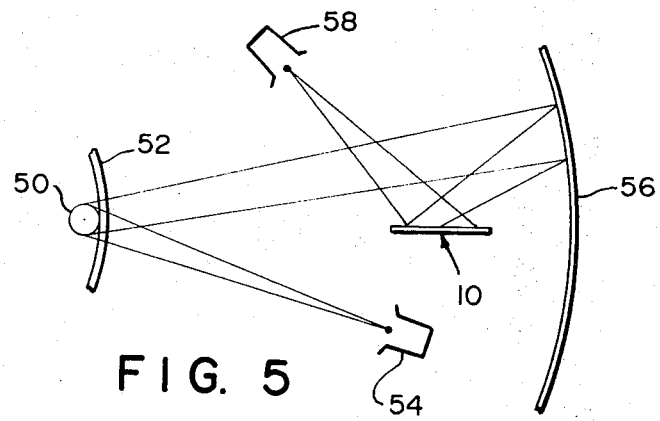
FIG. 5 is a schematic diagram of apparatus for constructing a microwave hologram.

Another very useful application of my invention is in the construction of microwave holograms. FIG. 5 is a schematic diagram of a typical setup for forming a microwave hologram and shows a specimen 50 which is opaque to microwaves positioned behind an arbitrary body 52 which is transparent to microwaves. The specimen 50 is irradiated from a microwave source 54 here shown schematically as a radiating horn. The driving sources are not shown. The waves reflected from the specimen 50 are again passed through the body 52 and reflected by a curved reflector 56 onto a film pack 10 of the type previously described containing a photographic emulsion which has been sensitized by earlier exposure to actinic light and which is placed in intimate contact with a photographic developing agent within the pack. The film pack 10 is also irradiated with microwaves from a microwave reference source 58 which is supplied with microwave energy from the same source (not shown) as the source 54 in order to be coherent with it.

The microwaves emitted by the sourc 58 combine at the film pack 10 with the microwaves reflected from the specimen 50 to provide a phase reference for the reflected waves. As was previously the case, the resultant field generates localized heating in the silver halide particles within the emulsion to vary the developing time in accordance with the intensity of the field at each point by controlling the localized rate of diffusion of the developing agent to the emulsion layer and speed of the chemical reaction which develop the film. After "exposure" to the field for several seconds in this manner, the film pack 10 is removed from the field and the layer 16 containing the developing agent is separated from the emulsion layer 14 and is washed in fixative to prevent further activity.

Figure 6:
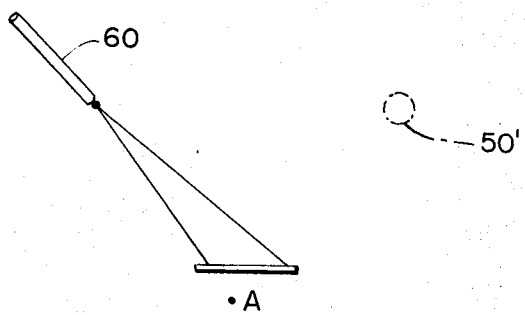
FIG. 6 is a schematic diagram of apparatus for reconstructing the specimen which has been recorded.

After the microwave hologram has been obtained in this fashion, it may be reduced in size for optical reproduction. The reduction factor is, of course, dependent on the differenece between the microwave frequency utilized to form the hologram and the frequency of the optical waves which are utilized to reconstruct the original specimen. The reconstruction process is illustrated in FIG. 6 which shows a light source 60, which is preferably a source of coherent light such as a laser, directing a beam of light onto the reduced microwave hologram 14' previously formed. When this is done, an observer standing at A and looking through the hologram will observe an image 50' which is a duplicate of the specimen 50. The body 52, which visually obstructed the specimen 50, is not reconstructed, since it did not reflect any microwaves directed onto it. Thus bodies which are opaque to visible light but transparent to microwaves are removed during the reconstruction process to provide access to specimens which lie behind them.

So far I have described my invention with respect to the measurement and recording of electromagnetic fields, particularly those in the microwave region. My invention is not so limited, however, and it may advantageously be employed to record any physical phenomenon capable of generating a thermal image of the field to be recorded. For example, the temperature distribution within the flame of a candle may be observed and recorded directly by placing the flame next to a photographic film surface which has first been "sensitized" as described above. The temperature distribution within the flame generates a corresponding distribution within the emulsion and causes the film to form an "image" whose intensity is directly proportional to the temperature distribution of the candle. An "exposure" of a few seconds is adequate for this purpose, depending on the film type and its development time. Other sources (such as sources in the far infra-red) which are not normally considered susceptible to visible recording may also be recorded in the manner described.

In this connection, it should be noted that the development time of some types of films may be controlled by controlling the sensitizing pre-exposure of the film to actinic light by choosing the appropriate developing agent. For example, color film of the type sold under the trademark "Polaroid" has an emulsion-coated negative which contains dyes of different colors in separate layers at increasing distances from the surface of the negative. The time required for each of these dyes to reach the surface of the negative is dependent on the respective distance of each from this surface. If the negative is pre-exposed to light of a wavelength which allows only that dye which lies nearest the surface to reach this surface, a relatively short development time will result; if, on the other hand, the negative is preexposed to light of wavelength which allows only that dye which lies farthest from the surface to reach this surface, then a relatively longer development time will result. Thus, in color film sold under the trademark "Polaroid," pre-exposure of the film through blue and green filters respectively to light having an ASA intensity rating of 75 for a brief time interval (of the order of $\frac{1}{25}$ second and $\frac{1}{50}$ second respectively) provided a longer development time than was obtained by pre-exposure through a red filter. In effect, the effective thickness of the diffusion layer is controlled by this technique. In this particular case, a blue-green color image was formed.

So far I have described my invention primarily in connection with photographic film since such film has the desired temperature sensitivity and is readily available. My invention is not so limited, however, and any structure in which the diffusion rate of one material through another may be controlled in a localized manner in accordance with the temperature variations of a thermal field is suitable for use in my invention. One example of such a structure is an ordinary blotter having one surface coated with an ink whose diffusion rate through the blotter at each point is dependent on the localized temperature at the respective points. Such a structure provides too rapid a diffusion rate for most practical uses, however, and structure having slower and more readily controllable diffusion rates will therefore be desired.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A method of providing a visible record of a thermal field comprising the steps of:
 (A) coating a diffusing agent on one surface of a recording medium comprising a diffusion barrier, at least one of said barrier and said agent being continuously responsive over a range of temperatures generated in said medium by said field to con- tinuously vary the localized rate of diffusion of said agent through said barrier in accordance therewith, (B) positioning said medium in said thermal field for energization solely by said field when so positioned and maintaining it therein for a time interval sufficient to cause the localized diffusion of said agent from said surface through said barrier in accordance with the localized temperatures in said field to thereby produce a visible replica of said thermal field, and (c) removing said medium from said thermal field and preventing further diffusion of said agent through said barrier to thereby preserve said replica.

2. The method of claim 1 in which said diffusion barrier comprises a photographic film having at least one emulsion layer containing a thermally responsive material capable of reproducing a thermal field to which it is exposed, said diffusing agent being diffusable through said emulsion to said thermally responsive material at rates dependent on the localized temperature of said material to cause said film to produce said replica of said thermal field.

3. The method of claim 2 in which said thermally responsive material includes a photochemically sensitive material which is sensitized before exposure to the thermal field by uniformly exposing said material to actinic light and in which said diffusing agent includes a photographic developing agent for developing said material to produce said replica.

4. The method of claim 3 in which said thermally responsive material includes a silver halide.

5. The method of claim 1 in which said diffusion barrier comprises a photographic film having a plurality of emulsion layers, successive layers being spaced from the coated surface of said diffusion barrier at increasing distances, each said layer containing a thermally responsive, sensitizable material capable of reproducing a thermal field, said diffusing agent being diffusible through said emulsion layers to said thermally responsive materials at rates dependent on the localized temperatures of said materials to cause the sensitized materials in the respective layers to produce said replica of said thermal field.

6. The method of claim 5 in which said materials are each selectively sensitizible to actinic light of a selected color and in which said materials are sensitized prior to insertion into the thermal field by exposing the materials in selected layers to actinic light of colors to which it is sensitive.

7. The method of claim 1 in which said thermal field is generated within said recording medium by the joule heating action of electromagnetic waves on said medium when said medium is placed in an electromagnetic field, the intensity of the electromagnetic field at each segment in said medium generating a localized heating effect which varies the rate of diffusion of the diffusing agent throughout each said segment.

8. The method of claim 7 in which at least a portion of the electric field component of said electromagnetic field is aligned generally parallel to, and within, said recording medium whereby localized electric currents may be generated in said medium by said electric field to thereby generate a thermal image corresponding to said electromagnetic field.

9. The method of claim 7 in which the frequency of said electromagnetic field lies in the range of from $10^7$ to $10^{10}$ Hz.

10. The method of claim 7 in which the frequency of said electromagnetic field lies in the range of from microwave frequencies to the near infrared.

11. A method of providing a visible record of an electromagnetic field lying outside the visible spectrum comprising the steps of:

(A) positioning in the electromagnetic field to be recorded, for energization solely by said field when so positioned, a recording medium comprising:

(1) a diffusion barrier separating a diffusing agent within said medium from an image-forming material within said medium;

(2) a diffusing agent for diffusion through said barrier to said image-forming material at a rate which is a continuous function of the localized temperature within said medium; and (3) an image-forming material responsive to said agent to produce a visible image on contact therewith; said medium being responsive to said electromagnetic field to establish within said medium a thermal field having a temperature distribution corresponding to the intensity distribution of said electromagnetic field;

(B) maintaining said medium in said electromagnetic field for a time interval sufficient to cause the localized diffusion of said agent through said diffusion barrier to produce a replica of the thermal field established by the electromagnetic field; and (C) removing said medium from said electromagnetic field and preventing further diffusion of said agent through said barrier to thereby preserve the replica formed in said medium.

12. The method of claim 11 in which said recording medium is aligned in said electromagnetic field in such a manner that the electric field within said electromagnetic field has at least a component extending parallel to, and lying within, said medium whereby said electric field may generate within said medium localized heating currents to form said thermal field.

13. The method of claim 12 in which said recording medium includes a photochemically-sensitive composition separated from said diffusing agent by said diffusion barrier, and in which said composition in sensitized by exposure to actinic light before being positioned in said electromagnetic field.

14. The method of claim 13 in which said diffusing agent comprises a photographic developing agent for reacting with said composition to thereby generate a visible replica of said electromagnetic field.

15. The method of claim 11 in which at least one of said diffusing agents and said diffusion barrier is further sensitized to heat by chilling said at least one agent or barrier to a temperature below the temperature at which said medium is to be exposed to said field.

16. A method of producing a visible record of an electric field comprising the steps of:

(A) sensitizing a photographic medium having a temperature responsive agent therein by uniform and controlled exposure to actinic light;

(B) uniformly coating the sensitized medium with a developing agent;

(C) positioning said medium in an electric field in such a manner that at least a component of said field lies parallel to, and within, a surface of said medium;

(D) maintaining said medium in said electric field for a time interval sufficient to allow the selective development of said medium in accordance with the localized intensity of said field within said medium;

(E) removing said medium from said field before said medium is developed over its entire area; and (F) preventing the further development of said medium to thereby fix the developed portions of said medium.

References Cited

UNITED STATES PATENTS 3,243,784   3/1966   Anderson et al. _____ 340—173

TERRELL W. FEARS, Primary Examiner

U.S. Cl. X.R.

340—173